United States Patent [19]

Bonitz

[11] 3,992,340

[45] Nov. 16, 1976

[54] VULCANIZED MOLDING COMPOSITIONS BASED ON BITUMEN AND OLEFIN POLYMERS

[75] Inventor: Eckhard Bonitz, Frankenthal, Germany

[73] Assignee: Badische Anilin- & Soda-Fabrik Aktiengesellschaft, Ludwigshafen (Rhine), Germany

[22] Filed: July 13, 1971

[21] Appl. No.: 162,274

[52] U.S. Cl. .......................... 260/28.5 AS; 106/274; 106/275; 208/44; 260/28.5 R; 260/28.5 A
[51] Int. Cl.[2] .......................................... C08L 95/00
[58] Field of Search .................. 260/28.5 R, 28.5 A, 260/28.5 AS, 41 C; 106/274, 275; 208/44

[56] References Cited
UNITED STATES PATENTS 3,317,447    5/1967    Black et al. .......................... 106/274

*Primary Examiner*—Melvyn I. Marquis
*Attorney, Agent, or Firm*—Johnston, Keil, Thompson & Shurtleff

[57]           ABSTRACT

Vulcanized compositions of matter obtained by heating a mixture of bitumen, an olefin polymer, sulfur and a sulfur-containing vulcanization accelerator to a temperature of 80° to 250° C.

10 Claims, No Drawings

VULCANIZED MOLDING COMPOSITIONS BASED ON BITUMEN AND OLEFIN POLYMERS

The present invention relates to molding compositions comprising bitumen, olefin polymers and sulfur, the sulfur being incorporated with the aid of vulcanization accelerators, and the invention also relates to processes for the manufacture of such molding compositions.

It has already been proposed to make molding compositions from bitumen, olefin polymers and sulfur by mixing the components at temperatures between 100° and 200° C. The mechanical properties of shaped articles made from these molding compositions are comparable with the mechanical properties of articles made from compositions consisting of bitumen and olefin polymers. The molding compositions containing sulfur in elementary form suffer from the drawback that the sulfur effloresces and burns to sulfur dioxide when the molding composition is heated in air. Thus it is necessary to take special precautions, for example, when sheeting prepared from such molding compositions is welded by means of hot air.

German Published Application DAS No. 1,280,727 reveals a method of making a composition by mixing bitumen, a mineral aggregate, sulfur and, optionally, a filler at a temperature of from 120° to 160° C. If the mixing temperature is above 160° C, the bitumen and sulfur react to form useless products. It is known that the reaction of bitumen with sulfur at such high temperatures leads to the formation of a glassy and brittle product with the evolution of hydrogen sulfide; cf. H. Abraham, "Asphalt and Allied Substances", D. van Nostrand Company, Inc., New York (1960) III, 12.

It is an object of the invention to provide a molding composition of bitumen, olefin polymers and sulfur, from which shaped articles may be produced which have a higher tear resistance and elongation than shaped articles made from the prior art molding compositions. It is also desirable that shaped articles made from the molding compositions of the invention show no adhesion to each other during storage, no longer have the color of bitumen, are odorless and show no sulfur bloom.

I have found that this and other objects and advantages of the invention are achieved with molding compositions consisting of (A) bitumen and (B) olefin polymers in a ratio of from 1 : 0.005 to 0.05 : 1 by weight and (C) from 0.05 to 30% by weight of sulfur incorporated by vulcanization with the aid of from 0.05 to 5% by weight of a vulcanization accelerator, the percentages being based on the total weight of components (A) and (B). The molding compositions may contain fillers and other additives, and a particularly advantageous method of preparing them is to mix bitumen and sulfur at temperatures between 20° and 160° C, add the olefin polymer and a vulcanization accelerator or a mixture obtained by homogenizing an olefin polymer and a vulcanization accelerator at temperatures between 100° and 250° C, and homogenizing the total mixture at temperatures between 80° and 250° C.

Since it is well known that sulfurized bitumen containing about 10% of sulfur is very brittle and splinters like glass when subjected to shock, it is surprising that mixing of sulfurized bitumen with olefin polymers produces molding compositions of which the properties are considerably superior to those of conventional molding compositions consisting of bitumen and olefin polymers and to those of molding compositions consisting of bitumen, olefin polymers and sulfur not prepared by the method of the invention. For example, the molding compositions of the invention are more resistant to sea water and ozone than the prior art compositions and do not become brittle when exposed to ultraviolet radiation even for long periods. They are odorless and shock-resistant and, at bitumen concentrations of up to about 60% by weight, they show no signs of embrittlement at temperatures down to −40° C. At lower bitumen concentrations the temperature at which embrittlement occurs is even lower. Molding compositions prepared by the process of the invention provide for example sheeting of improved strength properties, the improvement in tear resistance accompanied by improved elongation over conventional molding compositions being particularly noteworthy. Such findings were not foreseeable, since it is well known that the tear resistance of polyethylene may be increased by cross-linking, this being accompanied by a decrease in the elongation however. The molding compositions of the invention are more flexible than comparable mixtures of bitumen and olefin polymers.

Suitable bitumens for the compositions of the invention are all commercial natural and synthetic bitumens, asphalt, and the like, including air-blown and/or steam-blown bitumens. Preferred bitumens for use in the compositions of the invention generally have a penetration of from 10 to 300, as measured by German Standard Specification DIN 1995, and a softening point (ring and ball) between 75° and 32° C, as measured by DIN 1995. Also suitable, however, are thin bitumen oils, for example those which may be distilled at from 120° to 250° C at a pressure of from $10^{-2}$ to $10^{-3}$ mm of Hg and which possess very little inherent color. Very hard asphalts, for example asphalts which have been freed from bitumen oil, are also suitable for the preparation of the compositions of the invention.

By olefin polymers I mean polymers having an X-ray crystallinity of more than 20% at 25° C. These include the homopolymers of ethylene, propylene and butene-1 and copolymers of ethylene and butene-1. Particularly suitable are copolymers of ethylene with other copolymerizable ethylenically unsaturated compounds. Such copolymers contain at least 50% by weight of ethylene units. Suitable ethylenically unsaturated compounds which are copolymerizable with ethylene are acrylic and methacrylic esters derived from alcohols of from 1 to 8 carbon atoms, and vinyl carboxylic esters of saturated carboxylic acids of from 2 to 6 carbon atoms. I prefer to use copolymers of ethylene with n-, iso- or t-butyl acrylates or methacrylates or vinyl acetate. The molding compositions may be prepared from mixtures of the above olefin polymers if desired, for example mixtures of ethylene with a copolymer of ethylene and t-butyl acrylate or mixtures of high-pressure and low-pressure polyethylenes. For special applications of the molding compositions of the invention terpolymers, for example terpolymers of ethylene, an acrylate and acrylic acid, are useful. Such terpolymers are obtained, for example, by polymerizing ethylene with t-butyl acrylate under copolymerizing conditions such that a portion of the polymerized acrylate units provides polymerized units of free acid groups with the elimination of isobutylene. In this case the ethylene polymers contain from 0.1 to 7% molar and preferably from 0.2 to 5% molar of polymerized units of carboxylic acid groups.

The ratio of bitumen to olefin polymer is from 1 : 0.005 to 0.05 : 1. The melt index (190° C/2.16 kg) is between 0.01 and 50 g/10 min. (measured by ASTM D 1238–65 T), but is not critical for the molding compositions of the invention.

The molding compositions of the invention contain from 0.005 to 30% and preferably from 0.5 to 5% by weight of sulfur which has reacted with bitumen and/or olefin polymer in the presence of a vulcanization accelerator. The sulfur may be introduced as a powder or in the molten state.

Vulcanization accelerators are those compounds which are known to accelerate the crosslinking reaction of rubber with sulfur. The vulcanization accelerators, which are effective within the lower temperature range, contain for example the following structures:

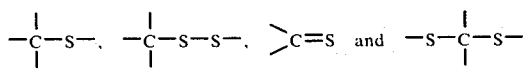

Known vulcanization accelerators, cf. "Kunststofflexikon", Carl-Hanser-Verlag, Munich (1967), 377 et seq., may be used in the process of the invention. Particularly useful vulcanization accelerators are thiuram monosulfides, thiuram disulfides, thiuram tetrasulfides, zinc dithiocarbamate, ammonium dithiocarbamate and alkali xanthates such as ammonium, sodium and potassium xanthates, thiosemicarbazide and mercaptobenzothiazole. The vulcanization accelerators are used in proportions ranging from 0.01 to 5% by weight based on the weight of bitumen and olefin polymer together. Borrowing terminology from rubber vulcanization it is possible to refer to the reaction of bitumen with sulfur in the presence of known vulcanization accelerators and, optionally, olefin polymers as vulcanization, because the products obtained are for example stronger and more flexible and also harder and stiffer than mere mixtures of bitumen, sulfur and olefin polymers.

Specifically, the molding compositions of the invention are prepared, for example, by mixing the bitumen and sulfur together at temperatures of from 20° to 160° C. When the sulfur is added to the bitumen the viscosity of the bitumen initially falls. For this reason, it is possible to mix the components at a temperature at which bitumen is normally very viscous. After the vulcanization accelerator has been added, a relatively easily controlled reaction takes place at temperatures between 120° and 220° C. Since the viscosity of the reaction mixture at the elevated temperature increases, the course of the reaction may be followed for example by carrying out viscosity measurements. The reaction is usually carried out above the decomposition temperature of the vulcanization accelerator and is complete after from about 1 to 30 minutes. The bitumen, which contains combined sulfur, is then homogenized with an olefin polymer or a mixture of a number of olefin polymers at temperatures of from 80° to 250° C. Alternatively, a mixture of bitumen, olefin polymers and sulfur may be prepared at temperatures between 20° and 120° C, this then being cured by the addition of a vulcanization accelerator. Yet another possibility is to prepare a mixture of bitumen and sulfur and add a mixture of an olefin polymer and a vulcanization accelerator and then homogenize the components at an elevated temperature to cause vulcanization. It is also possible to mix bitumen, olefin polymer and sulfur at temperatures of from 80° to 250° C and preferably from 140° to 180° C and to vulcanize the mixture with the aid of vulcanization accelerators by adding to the homogeneous mixture a vulcanization accelerator optionally in admixture with bitumen and/or olefin polymer. Using this technique, it is usual to homogenize from 80 to 98% by weight of the bitumen and olefin polymer with sulfur and to add the remaining bitumen and/or olefin polymer with the vulcanization accelerator. The latter mixture is then incorporated into the homogeneous mixture of bitumen, olefin polymer and sulfur. At temperatures above 160° C a molding composition containing combined sulfur is formed over from about 1 to 60 minutes.

A particularly advantageous method is to prepare a homogeneous mixture of an olefin polymer and a vulcanization accelerator at temperatures between 100° and 250° C and then mix this with a bitumen/sulfur mixture at temperatures between 80° and 250° C.

Another interesting process involves the preparation of a homogeneous mixture of an olefin polymer, sulfur and a vulcanization accelerator at temperatures between 80° and 250° C followed by mixing the homogeneous mixture with bitumen at temperatures between 80° and 250° C.

Other modifications of the process for the manufacture of the molding compositions of the invention are possible. In all cases, a molding composition is obtained which no longer exhibits the color of bitumen even when the bitumen concentration is relatively high.

Advantageously, the reaction between the bitumen, olefin polymer, sulfur and a vulcanization accelerator is carried out in the presence of a basic substance. Suitable basic substances are all of the usual basic materials providing a pH of more than 7.5 in aqueous solution or suspension, generally inorganic and preferably non-volatile materials such as oxides, hydroxides, sulfides, carbonates or silicates of metals in groups I and II of the Periodic Table, e.g. sodium hydroxide, calcium oxide, calcium hydroxide, potassium sulfide, sodium carbonate, sodium silicate and mixtures of oxides and/or hydroxides of elements in groups I and II of the Periodic Table and silicates. Particularly suitable basic substances are Portland cement and zinc oxide and/or iron(III) oxide. Other suitable basic substances are alkali and alkaline earth metal salts of organic acids of from 2 to 30 carbon atoms, alcoholates, phenolates, organic bases such as nitrogenous basic compounds, urea, ammonium bicarbonate and ammonium polysulfide.

The basic substance may contain up to 30% by weight of water and is added to the mixture of bitumen and olefin polymer in proportions ranging from 0.05 to 50% by weight. Basic substances which are readily soluble in water are preferably used in proportions ranging from 0.5 to 5% by weight.

The molding compositions of the invention may be modified in an advantageous manner by carrying out the reaction of the bitumen and sulfur in the presence of peroxides. This enables molding compositions to be made which have a higher concentration of combined sulfur. The peroxides used are, above all, dicumene peroxide, di-t-butyl peroxide, benzoyl peroxide, diacetyl peroxide, cyclohexanone peroxide and peroxides of bitumen prepared, for example, by treating bitumen with air at temperatures below 200° C, and hydroperoxides such as tetrahydronaphthalene hydroperoxide and decahydronaphthalene hydroperoxide. The effect achieved with organic peroxides is also obtained using compound which give off oxygen under the conditions of manufacture of the molding compositions, for example peroxydisulfates, permanganates, chlorates, perchlorates, nitrates of alkali metals, etc. The peroxides are used in proportions ranging from 0.01 to 2% and preferably from 0.05 to 1% by weight of the weight of the bitumen and olefin polymer together.

Conventional inorganic fillers and/or mineral inert pigments, etc. may be added to the mixtures, examples being powdered silica gel, fumed silica, carbon black, slate flour, gypsum, chalk, talcum, asbestos, powdered glass, glass fibers, rock wool, slag wool, bentonite, alumina, barytes, limestone or dolomitic lime, rock flour, titanium dioxide, metal titanates, chromium oxide and cadmium sulfide. Organic fillers such as straw, sawdust or wood chips and/or cork flour or granulated cork may be used if desired. The molding composition may contain from 2 to 70% by weight of said fillers, based on the weight of components (A) and (B) together. The mixtures of the invention may contain up to about 10% by weight of polystyrene and/or copolymers of styrene, for example copolymers of styrene with acrylonitrile, styrene with elastomers such 1,3-polybutadiene, polyisoprene, etc.

The molding compositions of the invention are mainly used in the building industry, for example as protective sheeting, for insulating roofs and for use in hydraulic engineering. The molding compositions are also suitable for coating surfaces of steel, cast iron, light metal, concrete and wood, for insulating cables, for impregnating paper and cardboard and in the manufacture of roofing felt. The molding compositions may also be used for making pipes, fabric coatings, boat skins and hoses. The molding compositions are also suitable for making road gutters and are useful as additives to asphalt and asphalt mixtures, in order, for example, to increase the ductility of these materials.

In the following Examples the parts are by weight. The tensile strength, tear resistance and elongation were tested according to German Standard Specification DIN No. 53,455.

EXAMPLE 1

200 parts of bitumen having a penetration of 80 and 40 parts of sulfur are stirred together in a heated vessel at 120° C. 0.2% by weight of mercaptobenzothiazole is then added and the mixture is heated at 165° C for 15 minutes. After this period the viscosity of the mixture shows no further substantial change. The vulcanized bitumen melt is homogenized with 200 parts of polyethylene having a density of 0.943 g/cm$^3$ and a melt index (190/20) of 5.8 at a temperature of 170° C. There is thus obtained a bluish gray composition. Shaped articles made from this composition have a tensile strength of 110 kg/cm$^2$, a tear resistance of 150 kg/cm$^2$ and an elongation of 800%. Pipes may be made from the molding composition.

EXAMPLE 2

Bitumen having a penetration of 200 is mixed with 0.2% by weight of zinc dimethyldithiocarbamate and 0.1% by weight of di-t-butyl peroxide at 60° C. This mixture is pumped by a heated pump upwardly through a vertical heated tube having a length of 2 meters and an internal diameter of 25 cm. Fused sulfur is also passed upwardly through the tube by means of a second heated pipe. The ratio of bitumen mixture to sulfur is 10 : 1 by weight. A temperature of 140° C is maintained in the tube. The residence time of the reaction mixture in the tube is 20 minutes. The vulcanized bitumen leaving the tube is immediately mixed, in a heated kneader, with fused polyethylene containing 5% by weight of polyisobutylene having a molecular weight of 100,000 (measured by the Staudinger method). The polyethylene had a melt index (190/2.16) of 1.4. The ratio of bitumen to polyethylene is 60 : 40 by weight. The resulting molding composition has the following properties: tear resistance 45 kg/cm$^2$, elongation 900%. Sheets made from this molding composition are bluish gray and do not adhere to each other even when stored for long periods. Such sheet is used for insulation purposes in the building industry, for example as roofing insulation.

EXAMPLE 3

Bitumen having a penetration of 200 is mixed with 30% by weight of sulfur in a stirred vessel at 140° C. After cooling the melt to 60° C, a mixture of 0.2% by weight of tetramethylthiuram disulfide and 0.1% by weight of dicumyl peroxide is added. 40 parts of this mixture are then homogenized, in a kneader, with 60 parts of high-pressure polyethylene having a density of 0.918 g/cm$^3$ and a melt index (190/2) of 0.4 at a temperature between 140° and 160° C. There is thus obtained a dark gray composition from which sheeting may be made. The tear resistance of the sheeting is 80 kg/cm$^2$ and its elongation is 700%.

EXAMPLE 4

In a heated kneader 40 parts of bitumen having a penetration of 25 and a breaking point between −5° and −8° C are mixed with 15 parts of sulfur at 150° C, and 0.1 part of tetramethylthiuram disulfide is then added. After 16 minutes the viscosity of the melt no longer falls. 20 parts of high-pressure polyethylene having a density of 0.918 g/cm$^3$ and a melt index (190/2) of 0.4 and 30 parts of low-pressure polyethylene having a density of 0.953 g/cm$^3$ and a melt index (190/20) of 2.3 are worked into the above melt at 180° C. From the homogeneous mixture sheeting having a gray appearance is made. The tear resistance of the sheeting is 110 kg/cm$^2$ and its elongation is 800%. The molding composition is useful in the building industry for sealing expansion joints. The molding compositions may, when used in particulate form, be employed for reinforcing asphalt in road engineering.

EXAMPLE 5

Following the procedure described in Example 4 a molding composition is made from the following components: 10 parts of bitumen having a penetration of 80 and a breaking point between −8° and −12° C, 200 parts of low-pressure polyethylene having a melt index (190/20) of 0.15 and a density of 0.946 g/cm$^3$, 2 parts of sulfur, 5 parts of carbon black and 1 part of thiosemicarbazide. There is obtained a molding composition which can be injection molded at temperatures above 200° C. The moldings have a gray appearance. On testing sheeting made from this molding composition the following properties are found: tensile strength 300 kg/cm$^2$, tear resistance 450 kg/cm$^2$, elongation 600%. The molding composition is particularly suitable for making pipes.

COMPARATIVE EXAMPLE 1

The above Example is repeated except that it is carried out in the absence of thiosemicarbazide. Sheeting made from the resulting molding composition has a tensile strength of 250 kg/cm$^2$, a tear resistance of 290 kg/cm$^2$ and an elongation of 200%.

EXAMPLE 6

Following the procedure described in Example 4, 50 parts of bitumen having a penetration of 45 and a breaking point between −8° and −11° C are mixed with 10 parts of sulfur and 0.05 part of dibenzoyl peroxide at 110° C. The bitumen mixture is then mixed with 25 parts of a copolymer of 80% by weight of ethylene and 20% by weight of vinyl acetate, 25 parts of low-pressure polyethylene having a density of 0.943 g/cm$^3$ and a melt index (190/20) of 5.8 and 3 parts of cement containing 0.2% by weight, based on the total composition, of tetramethylthiuram disulfide in a kneader at 160° C. From the homogeneous mixture sheeting can be made which is used for insulating roofs and foundations and for sealing applications in hydraulic engineering. The sheeting has a tear resistance of 85 kg/cm$^2$, an elongation of 750% and a Shore hardness A of 81.

EXAMPLE 7

Following the procedure described in Example 4, 50 parts of bitumen having a penetration of 80 and a breaking point between −8° and −12° C are vulcanized with 1.5 parts of sulfur, 0.5 part of diethylammonium carbamate and 1 part of zinc oxide. The bitumen mixture is then homogenized with 48.5 parts of low-pressure polyethylene having a density of 0.946 g/cm$^3$ and a melt index (190/20) of 5.4 and 5 parts of polypropylene having an intrinsic viscosity ($\eta$) of 2.5 at 180° C. The molding composition is suitable for making sheeting for the insulation of roofs and for coating onto fabrics, particularly fabrics of polypropylene. The sheeting has a tensile strength of 110 kg/cm$^2$, a tear resistance of 150 kg/cm$^2$, an elongation of 800% and a Shore hardness A of 90.

EXAMPLE 8

188 parts of bitumen having a penetration of 80 are heated at a temperature of 180° C in a stirred vessel. 14 parts of a polyethylene having a density of 0.918 g/cm$^3$ and previously mixed with 3 parts of sulfur and 0.1 part of tetramethylthiuram disulfide at 190° C are then added. The temperature is raised to 210° to 220° C. After about 30 minutes the viscosity of the mixture rises and then shows no further change. The mixture is cooled to 120° to 140° C. Using, in this temperature range, a casting technique not involving the application of pressure, there is obtained flexible, dry sheeting showing virtually no cold flow as is characteristic of the bitumen used as starting material. The composition is particularly suitable for improving the mechanical properties of bitumen mixtures used, for example, in road engineering.

If a solution containing 30% by weight of this molding composition dissolved in perchloroethylene is evaporated, there remains a coherent film which does not separate. Thus solutions of this molding composition may be used as coating compositions.

Solutions of molding compositions of bitumen, polyethylene and sulfur, in which the sulfur is not combined by vulcanization, yield, on evaporation of the solvent, tacky paste-like coatings, which separate into their individual components. Such coatings are useless for anticorrosive applications.

EXAMPLE 9

172 parts of bitumen having a penetration of 200 are heated at 180° C in a stirred vessel and homogenized with a mixture of 2 parts of sulfur, 0.2 parts of zinc dithiocarbamate and 22 parts of polyethylene powder. The density of the polyethylene is 0.920 g/cm$^3$ and the melt index (190/2.16) 0.3. After 20 minutes the viscosity of the mixture has risen sharply but then remains constant. The resulting composition is extruded at 130° C through a sheeting die to provide sheeting which may be readily welded by hot air and which is useful for sealing purposes in hydraulic engineering.

EXAMPLE 10

1,000 parts of a melt of an ethylene copolymer containing 20% by weight of n-butyl acrylate and having a melt index (190° C/2.16 kg) of 2.9 g/10 min. are compounded with a mixture of 0.5 part of tetramethylthiuram disulfide and 2.6 parts of sulfur in an extruder at from 180° to 200° C, the residence time being about 2 minutes. There is obtained a homogeneous, slightly yellow product having a melt index of 1.6 g/10 min., which is lower than that of the untreated copolymer.

700 parts of bitumen having a penetration of 80 are charged to a heated vessel equipped with a low-speed anchor agitator (approximately 40 to 80 r.p.m.) and the bitumen is heated at 180° C while 300 parts of the above mixture are added over from 5 to 10 minutes. The temperature of the mixture rises to about 200° C. After 20 minutes a homogeneous melt is obtained, which is stirred for a further hour and then pumped to a granulating device. There is obtained a granular product which shows no agglomeration even when stored for long periods.

Alternatively, sheeting is directly extruded from the homogeneous melt. When measured by DIN No. 53,455, the sheeting shows a tear resistance of 30 kg/cm$^2$ and an elongation of 1,300%.

COMPARATIVE EXAMPLE 2

If, following the procedure described in Example 10, 300 parts of the ethylene copolymer used in Example 10 but not containing any sulfur or vulcanization accelerator are added to 700 parts of bitumen having a penetration of 80, the time required for homogenization of the components under similar conditions is increased by about 8 times. The reason for this is that the polyolefin particles adhere to each other to form a coherent, stringy mass before they become distributed in the molten bitumen. The polyolefin layer floats on the surface of the bitumen and winds round the stirrer.

If the components are mixed at temperatures above 220° C in order to shorten the mixing time, or if the components are homogenized using an intensive mixer applying high shearing forces, the products obtained have much poorer strength properties.

Shaped articles made from the above composition show a tear resistance of 20 kg/cm$^2$ and an elongation of 600% when measured by DN 53,455. The melt index of the mixture is 3.6 g/10 min. (140° C/0.325 kg).

EXAMPLE 11

A mixture of 1,000 parts of polyethylene having a melt index (190° C/2.16 kg) of 1.6 g/10 min. and 50 parts of polystyrene having a melt index (200° C/5.0 kg) of 1.2 g/10 min. is homogenized with 0.05% by weight of tetramethylthiuram disulfide in a mixing machine at a temperature of 190° C. The homogeneous mixture is then mixed with bitumen having a penetration of 200 and previously mixed with 0.2% by weight of sulfur at about 130° C, the ratio of homogeneous mixture to said bitumen being 1 : 1 by weight. The resulting mixture is extruded through a sheeting die to form sheeting having a matt, black and dry surface. When measured by DIN 53,455, the sheeting has a tear resistance of 51 kg/cm² and an elongation of 650%.

The mixture may also be used for making paints by dissolving it in organic solvents such as are usually employed for oil paints and coating compositions.

COMPARATIVE EXAMPLE 3

If a mixture is prepared from the polymers and bitumen used in Example 11 in the same ratio but in the absence of sulfur and vulcanization accelerator and the resulting homogeneous mixture is dissolved in turpentine oil or toluene with heating, separation occurs on cooling. There is obtained a pasty mass which is no use as a coating composition.

EXAMPLE 12

Following the procedure described in Example 11, 800 parts of an ethylene copolymer containing 20% by weight of n-butyl acrylate and having a melt index (190° C/2.16 kg) of 2.9, 200 parts of polyethylene having a density of 0.96 g/cm³ and a melt index (190/21.6) of 6.2 g/10 min. are homogenized at a temperature of 220° C with a portion of a reaction product obtained from ethylene diamine and carbon disulfide by oxidation with hydrogen peroxide and acting as vulcanization accelerator, 10 parts of sulfur and 5 parts of morpholine. If this product is mixed with bitumen having a penetration of 80 in a ratio of 1 : 9 by weight in a conventional vessel equipped with an anchor agitator, a homogeneous mixture is obtained very rapidly and may be melt-spun at temperatures of from 100° to 150° C. The spun composition may be used to make non-woven fabrics and felt-like structures. If, for example, 30% by weight of this product is dissolved in a solvent mixture of 90 parts of turpentine oil and 10 parts of toluene, a coating composition is obtained.

COMPARATIVE EXAMPLE 4

Example 12 is repeated except that the vulcanization accelerator, sulfur and morpholine are omitted. It is then not possible to stir the polyolefin mixture into the bitumen, because the molten polyolefin mixture collects around the stirrer and cannot be readily distributed in the molten bitumen.

I claim:
1. A process for the production of a vulcanized composition of matter which comprises mixing
1. an olefin polymer having an X-ray crystallinity of more than 20% by weight at 25° C and selected from the group consisting of homopolymers of ethylene, propylene and butene-1, copolymers of ethylene and butene-1, and copolymers of ethlene with other ethylenically unsaturated monomers, said copolymers containing more than 50% by weight of ethylene units;
2. sulfur;
3. a vulcanization accelerator selected from the group consisting of compounds containing the following structures:

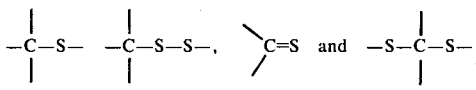

at a temperature of from 80° to 250° C; adding to said mixture
4. bitumen having a penetration of from 10 to 300; and thereafter homogenizing the mixture at a temperature of from 80° to 250° C, the ratio of component 4 to component 1 being from 1:0.005 to 0.05:1 by weight, the amount of sulfur being from 0.05 to 30% by weight based on the combined weights of said components 4 and 1, and the amount of said component 3 being from 0.01 to 5% by weight based on the combined weights of said components 4 and 1.

2. A process for the production of a vulcanized composition of matter as claimed in claim 1, which comprises mixing bitumen and sulfur at a temperature of from 20° to 160° C, adding the olefin polymer and a vulcanization accelerator at temperatures ranging from 80° to 250° C and homogenizing the mixture.

3. A process for the production of a vulcanized composition of matter as claimed in claim 1, which comprises mixing bitumen and sulfur at a temperature of from 20° to 160° C, adding a mixture which has been prepared by mixing an olefin polymer and a vulcanization accelerator at temperatures ranging from 80° to 250° C, and homogenizing the final mixture at temperatures ranging from 100° to 250° C.

4. A process for the production of a vulcanized composition of matter as claimed in claim 1, which comprises mixing bitumen, the olefin polymer and sulfur together at a temperature of from 80° to 160° C, adding a vulcanization accelerator at a temperature of from 80° to 250° C and homogenizing the mixture.

5. A process as described in claim 1 wherein said component 3 is selected from the group consisting of thiuram sulfide, thiuram disulfide, thiuram tetrasulfide, zinc dithiocarbamate, ammonium dithiocarbamate, ammonium xanthate, sodium xanthate, potassium xanthate, thiosemicarbazide and mercaptobenzothiazole.

6. A process as in claim 1 wherein a compound selected from the group consisting of dicumene peroxide, di-t-butyl peroxide, benzoyl peroxide, cyclohexanone peroxide, diacetyl peroxide, peroxides of bitumen, peroxydisulfates, permanganates and nitrates of alkali metals in an amount of from 0.01 to 2% by weight of the combined weights of components (4) and (1) is added to said mixture.

7. A process as in claim 1 wherein a basic substance selected from the group consisting of an oxide, hydroxide, sulfide, carbonate or silicate of a metal of group I or II of the Periodic Table, an alkali metal salt or an alkaline earth metal salt of an organic acid having from 2 to 30 carbon atoms, nitrogen bases, ammonium bicarbonate and ammonium polysulfide in an amount of from 0.05 to 50% by weight of the combined weights of components (4) and (1) is added to said mixture.

8. A vulcanized composition of matter prepared by the process of claim 1.

9. A product prepared by the process of claim 6.

10. A product prepared by the process of claim 7.

* * * * *